US009760836B2

(12) United States Patent
Ketkar et al.

(10) Patent No.: US 9,760,836 B2
(45) Date of Patent: Sep. 12, 2017

(54) DATA TYPING WITH PROBABILISTIC MAPS HAVING IMBALANCED ERROR COSTS

(71) Applicants: Nikhil Shirish Ketkar, Gurgaon Haryana (IN); Vineet Bharti, Gurgaon (IN); Gaurav Mishra, Gurgaon (IN); Olivier Mirandette, Montreal (CA)

(72) Inventors: Nikhil Shirish Ketkar, Gurgaon Haryana (IN); Vineet Bharti, Gurgaon (IN); Gaurav Mishra, Gurgaon (IN); Olivier Mirandette, Montreal (CA)

(73) Assignee: GUAVUS, INC., San Mateo, CA (US)

( * ) Notice: Subject to any disclaimer, the term of this patent is extended or adjusted under 35 U.S.C. 154(b) by 425 days.

(21) Appl. No.: 14/486,212

(22) Filed: Sep. 15, 2014

(65) Prior Publication Data
US 2015/0081710 A1 Mar. 19, 2015

Related U.S. Application Data

(60) Provisional application No. 61/878,237, filed on Sep. 16, 2013.

(51) Int. Cl.
*G06F 7/00* (2006.01)
*G06F 17/30* (2006.01)
*G06N 7/00* (2006.01)

(52) U.S. Cl.
CPC ....... *G06N 7/005* (2013.01); *G06F 17/30952* (2013.01)

(58) Field of Classification Search
CPC ......... G06F 17/30321; G06F 17/30914; G06F 3/0237; G06F 17/3033; G06F 17/30864; G06F 17/30958; G06F 17/30994; G06F 11/0739; G06F 17/10; G06F 17/2715; G06F 17/30153; G06F 17/30247; G06N 7/005; G06N 5/00; G10L 15/197; G10L 25/27; G06Q 30/0254; G06Q 30/0269
See application file for complete search history.

(56) References Cited

U.S. PATENT DOCUMENTS

| 7,483,918 | B2* | 1/2009 | Chaudhuri | G06F 17/30312 |
| 8,290,972 | B1* | 10/2012 | Deshmukh | G06F 17/30489 |
| | | | | 707/758 |
| 2009/0112795 | A1* | 4/2009 | Abraham | G06F 17/30536 |
| 2014/0244642 | A1* | 8/2014 | Yogev | G06F 17/30584 |
| | | | | 707/737 |
| 2014/0304238 | A1* | 10/2014 | Halla-Aho | H04L 51/12 |
| | | | | 707/692 |

* cited by examiner

*Primary Examiner* — Augustine K Obisesan
(74) *Attorney, Agent, or Firm* — Morgan, Lewis & Bockius LLP

(57) ABSTRACT

A plurality of data keys are associated with a plurality of type values; query frequencies of the data keys are known. A computer memory is divided into a plurality of tranches, each tranche including a probabilistic or non-probabilistic data structure. The data keys are stored in the tranches in accordance with their query frequencies such that, e.g., frequently queried data keys are stored in data structures having higher accuracy and infrequently queried keys are stored in data structure having less accuracy (and consequently require less memory space).

12 Claims, 3 Drawing Sheets

DATA TYPING WITH PROBABILISTIC MAPS HAVING IMBALANCED ERROR COSTS

CROSS-REFERENCE TO RELATED APPLICATIONS

This application claims priority to and the benefit of U.S. Provisional Patent Application Ser. No. 61/878,237, filed on Sep. 16, 2013, which is hereby incorporated herein by reference in its entirety.

TECHNICAL FIELD

Embodiments of the present invention relate generally to data typing and, more particularly, to determining type values for given data keys given a known association of data keys to type values.

BACKGROUND

In computer science, an associative array, map, symbol table, or dictionary is an abstract data structure composed of a collection of (key, value) pairs; a key is used to address the value associated therewith. Keys or "data keys" may be any items of data, such as numbers, names, or addresses; values or "type values" may be a number of categories or groupings to which subsets of the data keys may be assigned. For example, number data keys may be assigned to type values "odd" and "even." A common task in data and computer processing involves determining a type value $V_i$ of a data key $K_j$, given a set of a priori associations between data keys and type values. For example, it may be known that data keys $K_1$-$K_{10}$ are of type value $V_1$ and that data keys $K_{11}$-$K_{20}$ are of type value $V_2$; a data structure may be created to store these associations. If a data key $K_j$ of unknown type is encountered, its type value $V_i$ may be determined by looking up the data key $K_j$ in the data structure, which returns the corresponding type value $V_i$.

A straightforward implementation of the data structure that stores the associations might include an array, look-up table, or similar construct. This implementation, however, would consume a prohibitively large amount of memory when the set of data keys $K_j$ and/or set of type values $V_i$ becomes large (e.g., on the order of millions or billions). Such a large data structure might also increase the computing processing power and time required to complete a look-up request to undesirable levels.

A more sophisticated implementation might use a probabilistic data structure to store the associations; such a data structure trades off accuracy for reduced memory size and/or speed. For example, the probabilistic data structure might consume less memory than the straightforward implementation, but would return a type value $V_i$ for a given data key $K_i$ that is accurate only within a certain margin of error. This margin of error may be unacceptable for many applications; however, decreasing the margin of error of the probabilistic data structure to an acceptable level may increase the memory footprint of the probabilistic data structure to an unacceptable level.

A need therefore exists for a system and method of determining type values $V_i$ for given data keys $K_i$ with greater accuracy and reduced memory footprint.

SUMMARY

In general, various aspects of the systems and methods described herein relate to efficiently retrieving a type value of a queried data key with a tolerable error probability determined by a user. The data key, its associated type value, and the mapping therebetween may be stored in a computer memory using a data structure. In various embodiments, the data key, associated type value, and the mapping are pre-determined or known prior to constructing the data structure. In one implementation, a collection of the data keys is partitioned into one or more groups (e.g., tranches), each having a set of data keys, based on the queried frequencies thereof. For example, the collection of the queried data keys may form a heavy-tailed distribution (such that, for example, 10% of the data keys might be selected in 90% of the queries); groups having more-frequently-encountered data keys may have higher budgets, and therefore a smaller failure probability, compared to groups that have the less-frequently-encountered data keys. Additionally, each group may include one or more building blocks (e.g., Bloom filters) that store associations of the set of data keys related to the corresponding type values; the size of each building block may be determined based on the number of data keys each block represents, a pre-determined budget (or cost), the tolerance of the failure probability therewithin and/or the user's preference. Further, the mechanism for retrieving the type values of the queried data keys may include searching the groups and/or building blocks that include the more-frequently-encountered data keys before searching those that include the less-frequently-encountered data keys. The data structure and retrieval approach in the present invention thus effectively reduces the memory footprint and increases processing speed while still maintaining an acceptable failure probability. In one embodiment, if the queried data key is absent in the mapping, the data structure in the present invention reports the absence explicitly, rather than returning a false type value. Further, a least-recently used (LRU) cache may be used in conjunction with the data structure to cache the pairs containing the data key and its associated type value, thereby expediting retrieval.

In one aspect, a method of retrieving a type value associated with a queried data key includes receiving, via a computer network, a plurality of data keys and type values and query frequencies associated therewith; creating a tranche data structure within a computer memory, the tranche data structure comprising a plurality of memory tranches; storing a different set of data keys in each of the memory tranches based on query frequencies associated with the data keys, each tranche having a size also based on the query frequencies and wherein at least two tranches have different sizes; determining, using a computer processor, a memory-size cost of each tranche based on the query frequencies associated with the data keys contained in each grouping; creating and storing, in a computer memory, a probabilistic data structure for a memory tranche that maps a data key to a type value with a given probability of accuracy, wherein the probabilistic data structure is created based at least on (i) the memory-size cost, (ii) a number of represented data keys, and (iii) an error probability, and wherein at least two tranches have different memory-size costs; and querying the probabilistic data structure to determine a type value associated with a data key of unknown type value.

Mapping the data key to the type value may be performed in an order based on the query frequencies associated with the data keys in each probabilistic data structure. The tranches may be iterated over during the mapping. The mapping may be performed in an order based on the queried frequencies of the data keys contained within each tranche. The mapping may be performed in an ascending order of the queried frequencies of the data keys contained within each tranche. The data keys and the associated type values may be cached in a least-recently-used cache.

In another aspect, a system for retrieving a type value associated with a queried data key includes a computer memory for storing a plurality of data keys and type values and query frequencies associated therewith; a computer processor configured to execute computer instructions for: (i) creating a tranche data structure within the computer memory, the tranche data structure comprising a plurality of memory tranches; (ii) storing a different set of data keys in each of the memory tranches based on query frequencies associated with the data keys, each tranche having a size also based on the query frequencies and wherein at least two tranches have different sizes; (iii) determining, using a computer processor, a memory-size cost of each tranche based on the query frequencies associated with the data keys contained in each grouping; (iv) creating and storing, in a computer memory, a probabilistic data structure for each tranche that maps a data key to a type value with a given probability of accuracy, wherein the probabilistic data structure is created based at least on (i) the memory-size cost, (ii) a number of represented data keys, and (iii) an error probability, and wherein at least two tranches have different memory-size costs; and (vi) querying the probabilistic data structure to determine a type value associated with a data key of unknown type value.

Mapping the data key to the type value may be performed in an order based on the query frequencies associated with the data keys in each probabilistic data structure. The tranches may be iterated over during the mapping. The mapping may be performed in an order based on the queried frequencies of the data keys contained within each tranche. The mapping may be performed in an ascending order of the queried frequencies of the data keys contained within each tranche. The data keys and the associated type values may be cached in a least-recently-used cache.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
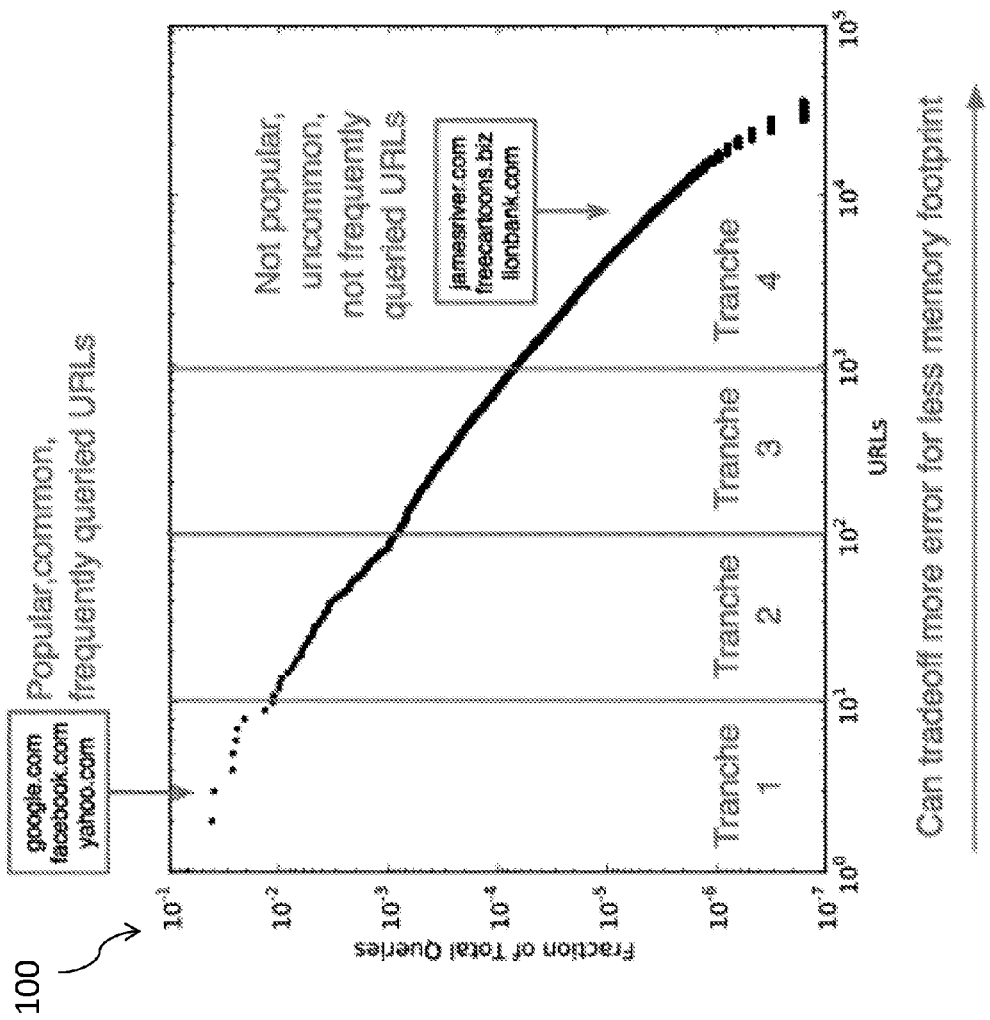
FIG. 1 depicts a frequency distribution of the number of queries made against particular data keys in accordance with an embodiment of the current invention.

Described herein are various embodiments of methods and systems for storing and retrieving type values $V_i$ associated with data keys $K_j$ given a data key $K_j$ of unknown type. In one embodiment, the data keys are Internet website URLs, and the type values are categories of website types such as "webmail," "video streaming," "social media," "online retail," and so on. The present invention is not limited to only URLs and website types, however, and any set of data keys and type values having a heavy-tailed distribution (in which a minority of data keys comprise a majority of queries) is within the scope of the present invention. Referring to FIG. 1, in one embodiment, a graph 100 depicts that certain data keys $K_j$ are encountered more frequently than others; the associations between the more-frequently-encountered data keys $K_j$ are stored in computer memory using data structures having greater accuracy (and relatively higher memory requirements) while less-frequently-encountered data keys $K_j$ are stored in computer memory using a data structures having less accuracy (and relatively lower memory requirements). The data structures may be non-probabilistic (for greatest accuracy) or probabilistic (and designed for a tradeoff between accuracy and memory footprint). When a data key $K_j$ having an unknown type value $V_i$ is encountered, the higher-accuracy data structures are queried first; the lower-accuracy, less-frequently used data structures are queried only if the data key $K_j$ is not found in the higher-accuracy data structures. Data structures of similar accuracy and memory footprint may be grouped into tranches.

For example, referring again to FIG. 1, popular, common, and frequently-queried URLs may be assigned to a first tranche; this first tranche may be implemented using a non-probabilistic data structure (such as a minimal perfect hash) or a probabilistic data structure having a high accuracy (and correspondingly higher memory requirement). Unpopular, uncommon, and infrequently queried URLs may be assigned to a fourth tranche implemented using a probabilistic data structure having a lower accuracy (and hence lower memory requirement). Intermediate second and third tranches may be implemented using probabilistic data structures having a mid-range accuracy and memory requirement. In one embodiment, each tranche from 1 to 4 has a decreasing memory budget.

Thus, in one embodiment, the set of the data keys $K_j$, the set of the corresponding type values $V_i$, and a mapping function M associating each data key $K_j$ to its type value $V_i$ (i.e., M: $K_j \rightarrow V_i$) are first collected and/or defined. Given an input of a subset of the data keys $K_g$ ($K_g \subseteq K$), the corresponding values $V_g$ ($V_g \subseteq V$) of the subset may then be stored and/or retrieved using the mapping function M. The set of the data keys $K_g$ may be divided into a set of n groups (e.g., tranches), $T_1, T_2, T_3, \ldots, T_n$ (where $T_1 \cup T_2 \cup \ldots = K_g$); each tranche is associated with a budget (in bytes, kilobytes, or any other metric), $B_1, B_2, B_3, \ldots, B_n$, respectively. The set of tranches and/or budgets may be known or pre-determined. A lookup table may be developed as further described below to allow for the lookup queries over $K_g$ making an efficient use of the allocated budgets. In one embodiment, queries are drawn from an underlying distribution that is known a priori.

Because the overall budget=$B_1+B_2+\ldots B_n$ is typically constant, in some embodiments, efficiency in associating each data key $K_j$ with its type value $V_i$ is measured as the number of false positives (i.e., an incorrect type value being reported for a data key or a type value being reported for a data key that does not exist in the data key set $K_g$) in answering queries. The overall budget B may first be determined by a user, system, function, or other specification; the set of data keys $K_g$ may then be partitioned into tranches and their associated budgets $B_{1,2}$ ... may be defined in a variety of ways to conform to the overall budget B while optimizing the mapping efficiency and reducing the overall errors. The user may explore the effects of her choices on the overall budget and/or the budgets associated with the tranches and decide on the one(s) that gives the least overall error.

In various embodiments, a probabilistic data structure includes one or more building blocks that stores associations related to one or more type values V. The building block may be, for example, a Bloom filter, a Bloomier filter, or any other such probabilistic data structure known in the art. The following discussion is focused on Bloom filters, but one of skill in the art will understand that it may be adapted to any other type of probabilistic data structure. In one embodiment, the Bloom filter includes a bit array of m bits, all initially set to zero; this provides the probabilistic data structure allowing for insert and lookup queries (e.g., a data key $K_j$ may be inserted and the presence of a particular data key $K_j$ may be checked). For example, a data key may be fed to one or more hash functions to obtain k-array positions; bits in the Bloom filter corresponding to the k-array positions may be set to one to insert the data key into the Bloom filter. To query a data key, the data key may, again, be fed to the hash function(s) to obtain the k-array positions. If any of the bits in the Bloom filter is zero at these positions, the queried data key is not in the Bloom filter. If all positions in the bits of the Bloom filter are one, then either the data key is in the Bloom filter or the bits have been set to one during the insertion of other data keys, thereby resulting in a false positive (or a failure). Similarly, when the queried data key is absent in $K_g$, the data structure is expected to report the absence; if, however, a value is reported, this is counted as a failure event as well.

The failure probability P of a Bloom filter having an m-bit array and representing n data keys may be expressed as:

$$m = -\frac{n \ln P}{(\ln 2)^2}. \tag{1}$$

Equation (1) indicates that the failure probability may be reduced by increasing the size of the Bloom filter and/or reducing the number of represented data keys. Such reduction, however, unavoidably increases the memory cost, reduces processing speed, and/or renders the probabilistic data structure less desirable due to the low storage capacity of the data keys. In various embodiments, the Bloom filters or the probabilistic data structures in the current invention are appropriately sized in each tranche based on the number of data keys to be represented thereby; the budget for each tranche may be pre-determined by the user. For example, assuming that a tranche $T_i$ is given a budget $B_i$ and the data keys in this tranche map onto $W_i$ unique type values, the $W_i$ unique type values may be used to construct $W_i$ Bloom filters, each corresponding to a unique value. Note that $W_i$ may be small (e.g., on the order of a few hundred) as compared to the number of data keys in $T_i$. Because the number of data keys mapping onto a particular value in the tranche is known and the budget is pre-determined, the size of each of the Bloom filters is also pre-determined. Each Bloom filter in the tranche may have a different size, depending on the number of data keys that map onto the particular type value. Additionally, each Bloom filter may have a different failure probability that is determined based on the size thereof and/or the number of data keys represented thereby.

In one embodiment, the lookup table in the current invention includes multiple tranches, each having an array of Bloom filters. The number and sizes of the Bloom filters in each tranche is determined based on the failure probability associated therewith. In another embodiment, the tranches may include hash maps or minimal perfect hashing functions when the budgets are large enough. A hash map generally does not have any errors but requires the consumption of much more memory than Bloom filters. In some embodiments, the tranches include a mix of Bloom filters, hash maps, and/or minimal perfect hashing functions. The retrieval procedure for obtaining a type value of the queried the data key may involve looking up the data key in each of the Bloom filters (and/or the hash maps) in each of the tranches. As a result, this may result in looking up the data key in as many as T×W Bloom filters, where W is a set of the unique type values that the data keys in the tranches are mapped onto.

Figure 2:
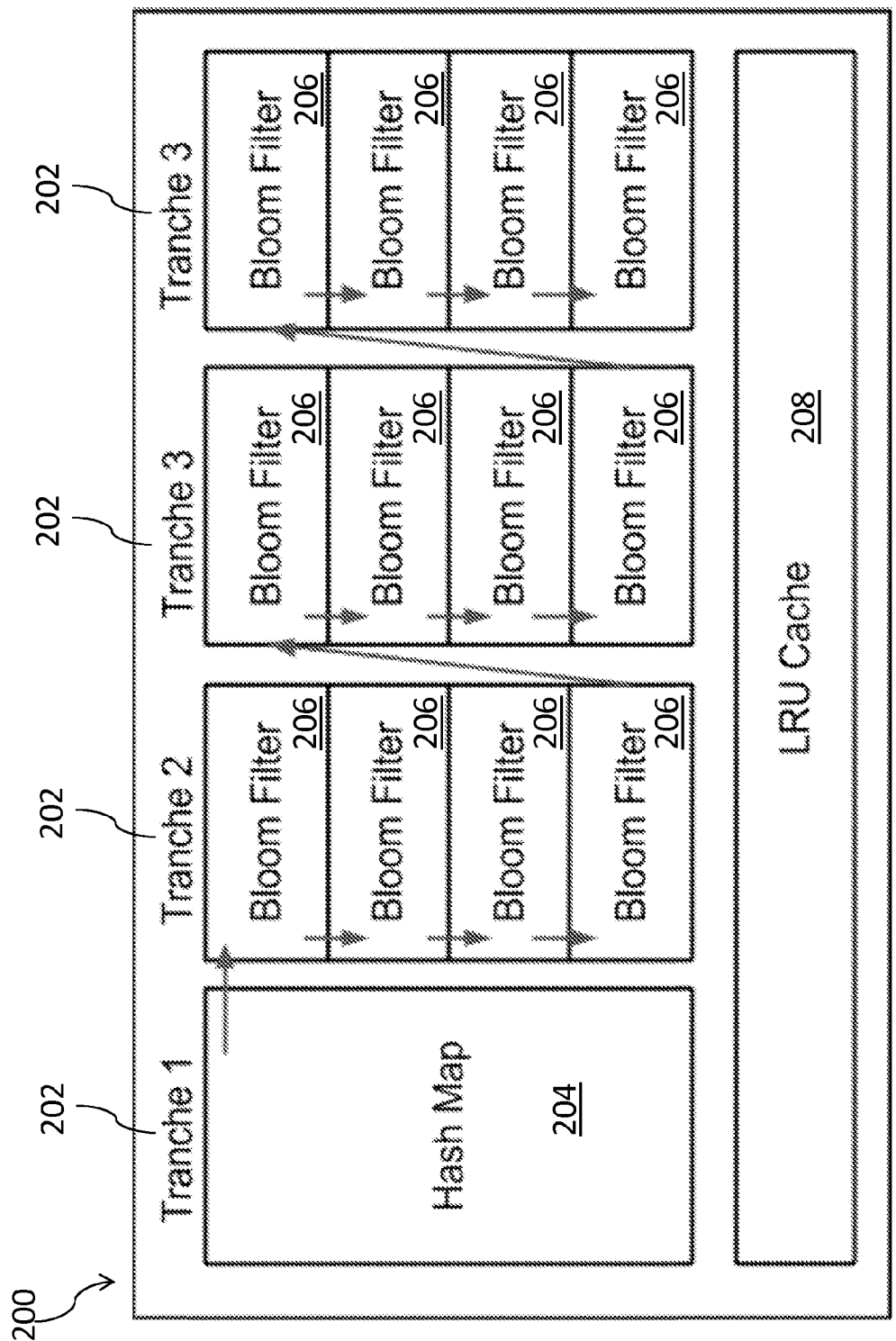
FIG. 2 depicts a partitioned lookup table and retrieving procedure of a queried data key in accordance with an embodiment of the current invention.

Referring to FIG. 2, in one implementation, a memory 200 includes a plurality of tranches 202, each tranche 202 including one or more non-probabilistic data structures (e.g., hash map 204) or probabilistic data structures (e.g., bloom filter 206). The lookup procedure may iterate over the tranches such that the tranches having higher budgets (per data key) are visited first, and within each tranche, the Bloom filters with a larger number of data keys are visited first; the type value corresponding to the first positive match is then reported. The budget for each tranche and/or Bloom filter may be determined based on, for example, the frequencies that the data keys represented thereby have been queried. In one embodiment, the tranche and/or Bloom filters that include more-frequently encountered data keys have a higher budget compared to those including less-frequently-encountered data keys. Accordingly, the failure probability of the tranches and/or Bloom filters that include more-frequently-encountered data keys is smaller than that of the tranches and/or Bloom filters having less-frequently-encountered data keys. In one embodiment, if a data key is not found in any of the tranches and Bloom filters contained therein, a failure event (i.e., the key not being found) is reported.

Although the current discussion focuses on grouping of the data keys of similar accuracy and memory footprint into tranches, the present invention is not limited to any particular approach of the grouping; additionally, the data keys may or may not be grouped. Further, the current discussion assumes a lookup order from high budgets to low budgets in the tranches and Bloom filters, but the present invention is not limited to any particular lookup order; for example, from low budgets to high budgets may be employed. One of ordinary skill in the art will understand that different groupings and/or lookup orders are within the scope of the current invention.

Note that the failure probability of any of the individual Bloom filters may not be interpreted as the failure probability of the overall tranches or lookup table. Because the presence of the data key is checked against multiple Bloom filters, the overall failure probability may be much higher than that of any of the individual Bloom filters. For example, a tranche may include a single array of X Bloom filters; each Bloom filter has a failure probability of $p_1, p_2, \ldots, p_X$, respectively. For a queried data key to be mapped correctly, not a single Bloom filter should fail (failure in this case is reporting that the key is present when it is actually absent). As a result, the overall failure probability of the array of Bloom filters is simply $1-\Pi(1-p_i)$; this overall failure probability, corresponding to the failure probability of the tranche, therefore is larger than that of a single Bloom filter. Next, assuming that the lookup table includes T tranches, each having a failure probability of $t_1, t_2, \ldots, t_T$, respectively, a lower bound on the expectation of the failure probability for a data key in tranche $t_i$ may be derived as follows based on the sequential lookup mechanism as described above: for the queried data key to succeed, all tranches including and prior to $t_i$ should not fail. Thus, the failure probability of the lookup for a data key in tranche $t_i$ is given by $1-\Pi(1-t_i)$. As a result, the lookup procedure in the present invention provides lower errors in the tranches that are visited earlier during a query. Accordingly, a combination of various budgets in different tranches based on the queried frequencies of the data keys represented thereby and the lookup mechanism of visiting the tranches as described above during the retrieval of the type key associated with the queried data key provide different failure probabilities in different tranches: the failure probabilities of the tranches including more-frequently-encountered data keys are lower than that of the tranches including less-frequently-encountered data keys.

In some embodiments, a least-recently used (LRU) cache, such as the LRU cache 208 of FIG. 2, is used to cache pairs of the data keys and their associated type values, thereby expediting the retrieval process. Because the tranches may be arranged based on the popularities of the data keys contained therein and the distribution of the queries may be heavy tailed (as illustrated in FIG. 1), the more popular or more-frequently-encountered data keys may be found in the LRU cache most of the time; this results in massive improvements in the lookup procedure. Although incorporation of the LRU cache may increase the memory space, the user may appropriately size the LRU cache to optimize the tradeoff between the memory space and processing time.

Various embodiments of the present invention may be used to analyze network traffic (on a network such as the Internet or a cellular network) by intercepting URLs requested by a client, determining the types of said URLs, and deploying and/or configuring the network based on the determined types. In one embodiment, reports or statistics of the analyzed network traffic are generated and provided to a third party to effect said deployment and/or reconfiguration. Because the tranche data structures described herein require less memory than existing systems, embodiments of the invention may be deployed at a large number of nodes on the network to thereby collect a wide variety of traffic data from a wide variety of clients; because the type-value lookup may be completed quickly, the traffic analysis may be carried out in real time or in near-real time. For example, if the traffic analysis determines that clients in a particular area, region, or IP domain are requesting a greater-than-average number of video streaming services, the network may be reconfigured to provide additional bandwidth to that area, region or domain by, for example, increasing the number of data caches or data mirrors therein.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

The various data structures and retrieval mechanism described above may be implemented, on a computer by computer-executable instructions, such as program modules, that are executed by a conventional computer processor. Generally, program modules include routines, programs, objects, components, data structures, etc. that performs particular tasks or implement particular abstract data types. Those skilled in the art will appreciate that the computer may include any of various computer system configurations, including multiprocessor systems, microprocessor-based or programmable consumer electronics, minicomputers, mainframe computers, and the like. The computer may also be realized in distributed computing environments where tasks are performed by remote processing nodes linked through a communications network. In a distributed computing environment, program modules may be located in both local and remote computer-storage media including memory storage devices.

Figure 3:
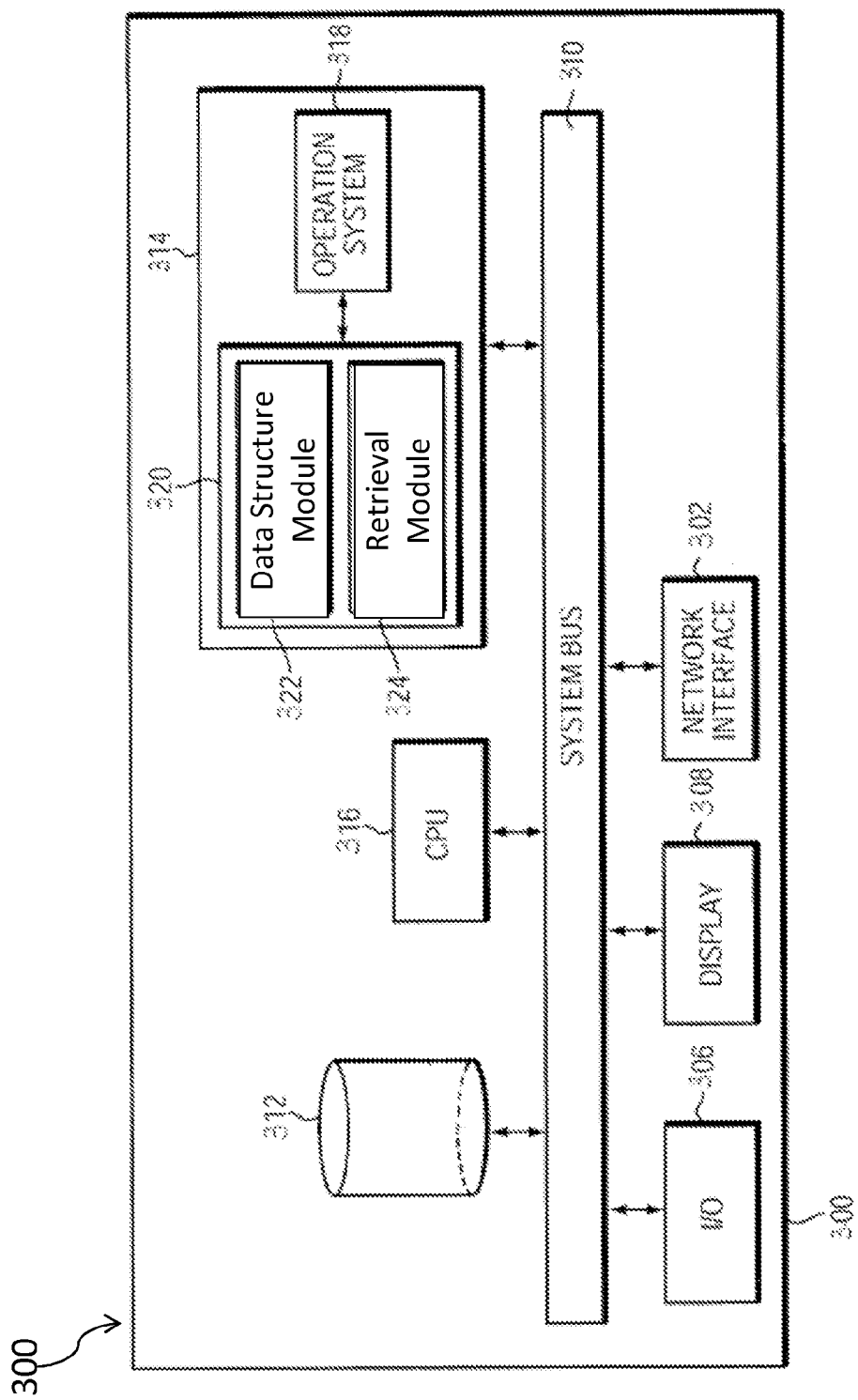
FIG. 3 is a block diagram of a system for retrieving a type value of a queried data key in accordance with an embodiment of the invention.

Thus, referring to FIG. 3, the computer may comprise or consist of a general- or special-purpose computing device in the form of a computer 300 including a network interface 302. The computer 300 also includes input/output devices 306 (e.g., a keyboard, a mouse or other position-sensing device, etc.), by means of which a user can interact with the system 300, and a screen display 308. The computer 300 further includes a bi-directional system bus 310, over which the system components communicate, a non-volatile mass storage device (such as one or more hard disks and/or optical storage units) 312, and a main (typically volatile) system memory 314. The operation of computer 300 is directed by a central-processing unit ("CPU") 316.

The main memory 314 contains instructions, conceptually illustrated as a group of modules, that control the operation of CPU 316 and its interaction with the other hardware components. An operating system 318 directs the execution of low-level, basic system functions such as memory allocation, file management and operation of mass storage devices 312. The operating system 318 may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform. At a higher level, a service application 320, which integrates a data structure module 322 with a retrieval module 324, carries out the construction of the data structures and the retrieval mechanism of the type value of a queried data key of the invention as described above.

Any suitable programming language may be used to implement without undue experimentation the analytical functions described above on the computer 400. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The computer 300 may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing units that execute commands and instructions may be general-purpose processors, but may utilize any of a wide variety of other technologies including special-purpose hardware, a microcomputer, mini-computer, mainframe computer, programmed micro-processor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method of retrieving a type value associated with a queried data key comprising:
   receiving, via a computer network, a plurality of data keys and type values and query frequencies associated therewith;
   creating a tranche data structure within a computer memory, the tranche data structure comprising a plurality of memory tranches;
   storing a different set of data keys in each of the memory tranches based on query frequencies associated with the data keys, each tranche having a size also based on the query frequencies and wherein at least two tranches have different sizes;
   determining, using a computer processor, a memory-size cost of each tranche based on the query frequencies associated with the data keys contained in each grouping;
   creating and storing, in a computer memory, a probabilistic data structure for a memory tranche that maps a data key to a type value with a given probability of accuracy, wherein the probabilistic data structure is created based at least on (i) the memory-size cost, (ii) a number of represented data keys, and (iii) an error probability, and wherein at least two tranches have different memory-size costs; and
   querying the probabilistic data structure to determine a type value associated with a data key of unknown type value.

2. The method of claim 1, wherein the mapping of the data key to the type value is performed in an order based on the query frequencies associated with the data keys in each probabilistic data structure.

3. The method of claim 1, further comprising iterating the mapping over the tranches.

4. The method of claim 3, wherein the mapping is performed in an order based on the queried frequencies of the data keys contained within each tranche.

5. The method of claim 4, wherein the mapping is performed in an ascending order of the queried frequencies of the data keys contained within each tranche.

6. The method of claim 1, further comprising caching the data keys and the associated type values in a least-recently-used cache.

7. A system for retrieving a type value associated with a queried data key comprising:
   a computer memory for storing a plurality of data keys and type values and query frequencies associated therewith;
   a computer processor configured to execute computer instructions for:
   (i) creating a tranche data structure within the computer memory, the tranche data structure comprising a plurality of memory tranches;
   (ii) storing a different set of data keys in each of the memory tranches based on query frequencies associated with the data keys, each tranche having a size also based on the query frequencies and wherein at least two tranches have different sizes;
   (iii) determining, using a computer processor, a memory-size cost of each tranche based on the query frequencies associated with the data keys contained in each grouping;
   (iv) creating and storing, in a computer memory, a probabilistic data structure for each tranche that maps a data key to a type value with a given probability of accuracy, wherein the probabilistic data structure is created based at least on (i) the memory-size cost, (ii) a number of represented data keys, and (iii) an error probability, and wherein at least two tranches have different memory-size costs; and
   (vi) querying the probabilistic data structure to determine a type value associated with a data key of unknown type value.

8. The system of claim 7, wherein the processor is configured to perform the mapping in an order based on the queried frequencies associated with the data keys in each probabilistic data structure.

9. The system of claim 7, wherein the processor is further configured to iterate the mapping over the tranches.

10. The system of claim 9, wherein the processor is configured to perform the mapping in an order based on the queried frequencies of the data keys contained within each tranche.

11. The system of claim 10, wherein the processor is configured to perform the mapping in an ascending order of the queried frequencies of the data keys contained within each tranche.

12. The system of claim 7, further comprising a cache memory for caching the data keys and the associated type values.

\* \* \* \* \*